United States Patent Office 3,560,499
Patented Feb. 2, 1971

3,560,499
PROCESS FOR THE PREPARATION OF
1,2,8,9-TETRAAZAPHENALENES
Karl J. Doebel, Ossining, and John E. Francis, Pleasantville, N.Y., assignors to Geigy Chemical Corporation, Ardsley, N.Y.
No Drawing. Continuation-in-part of applications Ser. No. 445,762, Apr. 5, 1965, Ser. No. 539,303, Apr. 1, 1966, and Ser. No. 583,980, Oct. 3, 1966. This application Nov. 13, 1968, Ser. No. 775,550
Int. Cl. C07d 51/04
U.S. Cl. 260—250    7 Claims

ABSTRACT OF THE DISCLOSURE 3-keto-2,3 - dihydro - 1,2,8,9-tetraazaphenalene and the corresponding 7-phenyl compound are prepared by treating 3-substituted phthalic acid derivatives with hydrazine. The compounds possess hypotensive properties and are chemical intermediates.

CROSS REFERENCE

This is a continuation-in-part of copending applications Ser. Nos. 583,980, 539,303 and 445,762 filed Oct. 3, 1966, Apr. 1, 1966 and Apr. 5, 1965 respectively, all now abandoned, Ser. No. 539,303 being a continuation-in-part of Ser. No. 445,762 and Ser. No. 583,980 being a continuation-in-part of Ser. Nos. 539,303 and 445,767.

DETAILED DESCRIPTION

This invention pertains to a process for the preparation of 1,2,8,9-tetraazaphenalenes and to the compounds thereby produced. In particular, the present invention comprises treating (a) a compound of the formula:

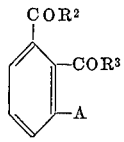

I wherein
A is an aldehyde, benzoyl, dibromomethyl or di(lower)alkoxymethyl group and
each of $R^2$ and $R^3$, independent of the other, is hydroxy or (lower)alkoxy or $R^2$ and $R^3$ taken together are a divalent oxygen atom, or (b) a compound of the formula:

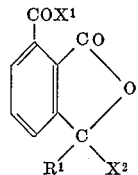

wherein each of $X^1$ and $X^2$ is hydroxy, (lower)alkoxy, chloro or bromo with at least two equimolar amounts of hydrazine until formation of a 3-keto-2,3-dihydro-1,2,8,9-tetraazaphenalene is complete.

The reaction is carried out with aqueous hydrazine or 100% hydrazine, optionally in an organic solvent such as ethanol, methyl Cellosolve, diethylene glycol or diglyme, generally at reflux temperature until the reaction is complete, a period generally of from 16 to 48 hours.

The simplest of the above starting materials are thus 3-aldehydophthalic acid and 3-benzoylphthalic acid. In addition to these however, various functional equivalents may be employed. For example, in place of the aldehyde function there can be a dibromomethyl group, as in 3-dibromomethyl phthalic acid. The aldehyde group can also be in the form of an acetal. Alternatively, or in addition, the carboxylic acid groups can be esterified or be in the form of an anhydride, as in the case of 2-dibromomethyl-6-carbomethoxybenzoic acid or 3-dibromomethylphthalic anhydride. The 3-aldehydo- or 3-benzoylphthalic acid can also be in its tautomeric form, a 3-hydroxy-7-carboxy phthalide, optionally bearing a phenyl group in the 3-position. In these phthalides, the hydroxy group in the 3-position can be etherified or replaced by a halogen atom, especially bromo, while the carboxylic acid function can be esterified or in the form of an acid halide, as in the case of 3-bromo-7-chlorocarbonylphthalide.

These various intermediates can be easily prepared via conventional methods. For example, when the known 3-methylphthalic anhydride or a substituted analog thereof is treated with at least two equivalents of N-bromosuccinimide under the influence of light, a 3-dibromomethyl phthalic anhydride is obtained. Treatment of this anhydride with aqueous base such as sodium hydroxide at from 25 to 90°, followed by acidification with a mineral acid yields 3-aldehydophthalic acid (which in its tautomeric form is 3-hydroxy-7-carboxyphthalide). Esterification under conventional techniques, e.g., an alkanol and a catalytic amount of acid, yields the dialkyl 3-aldehydophthalate (which in its tautomeric form is 3-alkoxy-7-carboalkoxyphthalide).

Likewise bromination of a 2-methyl-6-carbalkoxybenzoic acid (obtained through selective esterification of 3-methylphthalic acid) yields the corresponding 2-dibromomethyl-6-carbalkoxybenzoic acid.

In addition a 7-carboxyphthalide (obtained from a 3-bromomethylphthalic anhydride in a fashion analogous to that described above, i.e., successive treatment with base and acid) is converted to the corresponding 7-halocarbonylphthalide as with phosphorus oxychloride, thionyl chloride or the like and halogenated in the 3-position with a N-halosuccinimide to yield a 3-halo-7-halocarbonylphthalide.

The term "alkyl" denotes a straight or branched hydrocarbon chain. When qualified by the designation ("lower") such a chain will contain up to and including 6 carbon atoms. Illustrative of such alkyl groups are methyl, ethyl, propyl, isopropyl, butyl, sec-butyl, t-butyl, pentyl hexyl, and the like.

The compounds of the present invention are identified herein as derivatives of the novel parent tricyclic nucleus 1,2,8,9-tetraazaphenalene which is assigned the following numbering.

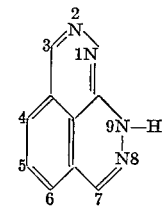

The product of this process may exist in several tautomeric forms, two of which may be represented as follows:

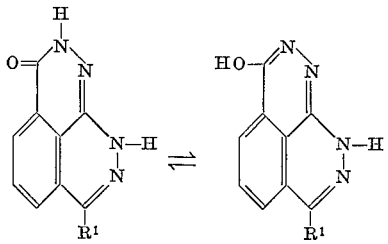

wherein $R^1$ is hydrogen or phenyl.

3-keto-2,3-dihydro-1,2,8,9-tetraazaphenalene and the corresponding 7-phenyl compounds are cardiovascular agents, in particular blood-pressure lowering agents. They also manifest coronary and peripheral vascular dilation properties, and anti-inflammatory activity.

The compounds can be administered parenterally or orally in any of the usual pharmaceutical forms including tablets, capsules, powders, suspensions, solutions, syrups and the like, including sustained release preparations which can be compounded by any of the known procedures.

In addition the 3-keto-2,3-dihydro-1,2,8,9-tetraazaphenalene and the corresponding 7-phenyl compound are valuable chemical intermediates. Thus, for example, treatment with phosphorus pentasulfide yields the corresponding 3-thiono-2,3-dihydro-1,2,8,9-tetraazaphenalene which is also a versatile intermediate. For example, refluxing such a thiono compound with hydrazine yields the corresponding 3 - hydrazino - 1,2,8,9 - tetraazaphenalene, which is known.

Also included within the scope of the present invention are the acid addition salts of these novel tetraazaphenalene derivatives, obtained via the conventional methods. Typical salts thus include those derived from hydrochloric, hydrobromic, sulfuric, phosphoric, methanesulfonic, acetic, lactic, succinic, embonic, malic, maleic, aconitic, phthalic, tartaric and the like acids. Quaternary salts derived from alkyl halides are also within the scope of this invention.

The following examples, presented for illustration and not limitation, will serve to further typify the nature of the present invention. In these examples temperature is expressed in degrees centigrade.

EXAMPLE 1

A mixture of 3-methylphthalic anhydride (81 g.), N-bromosuccinimide (182 g.), benzoyl peroxide (40 mg.) and carbon tetrachloride (1500 ml.) is irradiated and heated at reflux by a 100 watt insertion-type ultraviolet lamp under stirring and exclusion of moisture. After the mixture becomes brick red, an additional 40 mg. of benzoyl peroxide is added. Illumination at reflux is carried out during 24 hours. The mixture is cooled and filtered free of succinimide and the filtrate is evaporated in vacuo. The residual yellowish brown solid is dissolved in hot ether, treated with decolorizing charcoal and filtered. Addition of hexane to the filtrate affords the crystalline product, α,α-dibromo-3-methylphthalic anhydride, M.P. 90.5–93° C. in 72% yield. Two recrystallizations from etherhexane yield colorless needless melting at 93–95° C.

Calcd for $C_9H_4Br_2O_3$ (percent): C, 33.78; H, 1.26; Br, 49.92. Found (percent): C, 33.66; H, 1.20; Br, 49.41.

A suspension of α,α-dibromo-3-methylphthalic anhydride (80 g.) in ethanol (500 ml.) is treated with a solution of 100% hydrazine hydrate (100 ml.) and water (100 ml.) dropwise under stirring and cooling. A white suspension forms. After the addition, the temperature is raised gradually to reflux, whereupon the white suspension disappears and a yellow precipitate forms. After 88 hours at reflux, the mixture is cooled, filtered and the first crop of product is washed with water and ethanol and dried in vacuo. The mother liquors are evaporated in vacuo, dissolved in 500 ml. of glacial acetic acid and heated under reflux for 18 hours. The mixture is cooled and filtered and a second crop of the product obtained. The overall yield of 3-keto-2,3-dihydro-1,2,8,9-tetraazaphenalene, M.P. >347°, is 25.7 g., or 55% of theory. The product is recrystallized from 3 liters of boiling dimethylformamide and obtained as a yellow powder which, on heating, forms a microcrystalline solid at 220–270° C. and melts above 350° C.

Calcd (percent): C, 58.06; H, 3.25; N, 30.09. Found (percent): C, 57.92, 58.03; H, 3.58, 3.52; N, 30.28.

EXAMPLE 2

(a) 3-hydroxy-7-carboxyphthalide: α,α-Dibromo-3-methylphthalic anhydride (40 g.) is added in portions to a hot solution of 2 N sodium hydroxide (500 ml.) with stirring. After ten minutes, the clear solution is rendered strongly acidic with concentrated hydrochloric acid and heated for one-half hour at 80°. The solution is evaporated to dryness in vacuo and the residue is then dissolved in hot water (600 ml.), treated with decolorizing charcoal and filtered. After three days at 5° C., the colorless filtrate yields 21.3 g. (88%) of colorless blocks of 3-hydroxy-7-carboxyphthalide, M.P. 163.5–166° C. After two further crystallizations from water, the melting point is 165.5–168.5° C.

Calcd for $C_9H_6O_5$ (percent): C, 55.68; H, 3.12. Found (percent): C, 55.98; H, 2.99.

(b) 3-methoxy-7-carbomethoxyphthalide: A mixture of the compound of part (a) of this example (19.0 g.), absolute methanol (167 ml.) and concentrated sulfuric acid (10 ml.) is heated under reflux with moisture exclusion for five hours. About 100 ml. of methanol are removed by distillation. The residue is poured into ice-water (350 ml.) and extracted with chloroform (3 × 100 ml.). The chloroform extract is washed with 5% sodium carbonate solution, dried over sodium sulfate and concentrated to dryness in vacuo. The white solid residue, M.P. 79–88° C., is shown by infrared analysis to be a mixture of 3-aldehydo-dimethylphthalate and 7-carbomethoxy - 3 - methoxyphthalide. Several recrystallizations from ether yields a fraction of constant M.P., 94–97° C. whose analysis and infrared spectrum coincides with the structure of the pseudo ester 3-methoxy-7-carbomethoxyphthalide.

*Analysis.*—Calcd (percent): C, 59.48; H, 4.54. Found (percent): C, 59.66; H, 4.35.

I.R.: 1735 cm.$^{-1}$ (ester, 1790 cm.$^{-1}$ (γ-lactone)

From the mother liquor is isolated a low melting solid having a single carbonyl peak in the infrared, i.e., 1740 cm.$^{-1}$ (ester and aldehyde) to which the structure dimethyl-3-aldehydophthalate is assigned.

(c) 3-keto-2,3-dihydro - 1,2,8,9 - tetraazaphenalene: A mixture of 3-methoxy-7-carbomethoxyphthalide (1.11 g.), 100% hydrazine hydrate (4 ml.) and absolute ethanol (10 ml.) is refluxed under stirring for 94 hours. The yellow precipitate is collected from the hot solution, washed with water and methanol and dried in vacuo. After recrystallization from dimethylformamide, the product, M.P. >350° C., (0.82 g.) has an infrared spectrum identical to that of 3-keto-2,3-dihydro-1,2,8,9-tetraazaphenalene prepared as in Example 1.

EXAMPLE 3

(a) 7-carboxyphthalide: Crude 3-bromomethylphthalic anhydride (47.6 g., M.P. 74–87°), prepared according to the procedure of Albisetti, Barney, Cairns and Winberg, U.S. 2,729,622, is taken up in ethanol (100 ml.) and aqueous 2 N sodium hydroxide (500 ml.) and is heated for 15 minutes at 80°. The pale yellow solution is cooled, acidified with concentrated hydrochloric acid, heated at 80° for one hour and refrigerated overnight. The acid (35.4 g., M.P. 166–9° C.) separates in buff crystals. Two recrystallizations from methanol yield colorless blocks M.P. 168.5–171° C.

*Analysis.*— Calcd (percent): C, 60.66; H, 3.40. Found (percent): C, 60.41; H, 3.35.

(b) 7-phthalidylcarbonyl chloride: A mixture of 7-carboxyphthalide (38.54 g.) thionyl chloride (27 ml.) and dry benzene (108 ml.) is heated under reflux with exclusion of moisture for 3 hours. The excess solvent and thionyl chloride are distilled off in vacuo and the solid residue is recrystallized from benzene-hexane. The yield of product, M.P. 92–96.5° C., is 30.78 g., or 73% of theory.

(c) 3-bromo-7-phthalidylcarbonyl chloride: To a solution of 7-phthalidylcarbonyl chloride (30.5 g.) in carbon tetrachloride (1 liter) is added N-bromosuccinimide (26.85 g.) mixed with a little benzoyl peroxide. The mixture is stirred vigorously at reflux as the flask is illuminated with a 250 watt tungsten lamp. After all the N-bromosuccinimide has reacted, the mixture is cooled and filtered free of succinimide (14.62 g., M.P. 110.5–118° C.) and the filtrate is evaporated in vacuo. The residue is a buff-colored powder (28.7 g.) which shows infrared absorption at 1720 cm.$^{-1}$ (acid halide) and 1800 cm.$^{-1}$ (substituted γ-lactone) and fumes in moist air. This material is used directly, without further purification, in the next step.

The compound of part (c) (28.7 g.) dissolved in absolute ethanol (120 ml.) is added dropwise to a stirring solution of 100% hydrazine hydrate (50 ml.) in absolute ethanol (150 ml.). The reaction is exothermic and a clear solution is soon formed. The solution is heated under reflux overnight, the flocculent yellow precipitate which has formed is collected, washed with water and ethanol, triturated with dimethylformamide and filtered. The product, 3-keto-2,3-dihydro - 1,2,8,9-tetraazaphenalene, weighs 2.2 g.

EXAMPLE 4

(a) 2-methyl-6-carbomethoxybenzoic acid: A mixture of 3-methylphthalic acid (18.0 g.) absolute methanol (180 ml.) and concentrated sulfuric acid (10 ml.) is heated under reflux and exclusion of moisture for six hours. The solution is evaporated in vacuo to one-third volume, poured into ice-water 150 ml.) and extracted with chloroform (3× 100 ml.). The chloroform solution is extracted with excess sodium carbonate solution. The carbonate layer is acidified with concentrated hydrochloric acid under stirring and cooling, whereupon the crude half-ester precipitates. Three recrystallizations from benzene-hexane yield the pure product (8 g.) M.P. 110.5–111.5° C.

*Analysis.*—Calcd (percent): C, 61.85; H, 5.19. Found (percent): C, 61.97; H, 5.08.

(b) 3-methyl-2-carbomethoxybenzoic acid: To a solution of 3-methyl dimethylphthalate (20.79 g.) in ethanol (25 ml.) is added potassium hydroxide (5.61 g.) in water (25 ml.). The mixture is refluxed for 2 hours, then is cooled and basified to about pH 8 with sodium hydroxide solution. The solution is washed with ether to remove unreacted diester and acidified with hydrochloric acid. The crude product (15.0 g.) precipitates as a white solid. The solid is recrystallized from benzene-hexane (charcoal used), then methanol-water and finally benzene-hexane. White crystals, M.P. 114–5° C. are thus obtained.

*Analysis.*—Calcd (percent): C, 61.85; H, 5.19. Found (percent): C, 62.05; H, 4.95.

(c) 2-dibromomethyl-6-carbomethoxybenzoic acid: 2-methyl-6-carbomethoxybenzoic acid (9.7 g.) is dissolved in carbon tetrachloride (100 ml.) and is treated dropwise at reflux with bromine (16 g.) in carbon tetrachloride (50 ml.) under stirring, moisture exclusion and irradiation from a 250 watt tungsten lamp. When the solution has cleared and no further hydrogen bromide is evolved, the material is concentrated to dryness in vacuo. The oily product (20.5 g.) shows peaks in the infrared spectrum at 1720 cm.$^{-1}$ (ester and carboxyl) and 2700–2300 (bonded —OH) and is different from starting material. The crude product is used without further purification.

(d) 3-keto-2,3-dihydro-1,2,8,9-tetraazaphenalene: The product of part (c) (20.5 g.) is dissolved in a cold stirred solution of absolute ethanol (100 ml.) and treated dropwise with 50% hydrazine hydrate. The mixture is heated for 72 hours at reflux and then is filtered hot. The yield is 1.54 g., M.P. >348° C. The mother liquor is concentrated to dryness in vacuo and the residue heated under reflux for 66 hours with glacial acetic acid. The resulting yellow solution is evaporated to dryness in vacuo and the residue is triturated with methanol and filtered. The precipitate (1.8 g.) is combined with the previous crop and recrystallized from dimethylformamide. The infrared spectrum of the product, M.P. >348° C., is identical to that of an authentic sample of 3-keto-2,3-dihydro-1,2,8,9-tetraazaphenalene.

EXAMPLE 5

3-keto-7-phenyl-2,3-dihydro-1,2,8,9-tetraazaphenalene

By substituting 3-benzoylphthalic acid, prepared by permanganate oxidation of 2-methyl-6-benzoylbenzoic acid to the action of hydrazine as described in Example 1, there is obtained 3-keto-7-phenyl-2,3-dihydro-1,2,8,9-tetraazaphenalene, M.P. above 350° C.

What is claimed is:

1. Process for the preparation of a 3-keto-2,3-dihydro-1,2,8,9-tetraazaphenalene of the formula:

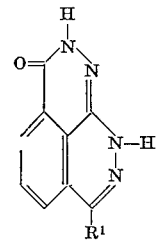

wherein $R^1$ is hydrogen or phenyl which comprises treating (a) a compound of the formula:

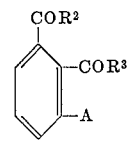

wherein

A is the aldehydo, benzoyl, dibromomethyl or a di(lower)alkoxymethyl group and each of $R^2$ and $R^3$, independent of the other, is hydroxy or (lower)alkoxy or $R^2$ and $R^3$ taken together are a divalent oxygen atom, or (b) a compound of the formula:

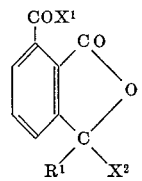

wherein each of $X^1$ and $X^2$ is hydroxy, (lower alkoxy), chloro or bromo with at least two molar equivalent amounts of hydrazine at a temperature of at least about 80° C.

2. The process according to claim 1 which comprises treating a compound of the formula:

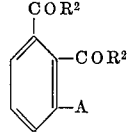

wherein A is benzoyl or dibromomethyl and each of $R^2$ and $R^3$ is as therein defined with at least two molar equivalent amounts of hydrazine at a temperature of at least about 80° C.

3. The process according to claim 2 wherein 3 - (dibromomethyl)phthalic acid anhydride is employed.

4. The process according to claim 2 wherein 3-benzoylphthalic acid is employed.

5. The process according to claim 2 wherein 2-dibromomethyl-6-carbomethoxybenzoic acid is employed.

6. The process according to claim 1 wherein 3-methoxy-7-carbomethoxyphthalide is employed.

7. The process according to claim 1 wherein 3-methoxy-7-carbomethoxyphthalide is employed.

References Cited

UNITED STATES PATENTS 3,429,882  2/1969  Doebel et al. _____ 260—250

N. S. RIZZO, Primary Examiner

U.S. Cl. X.R.

424—250